(12) United States Patent
Takayanagi

(10) Patent No.: US 7,443,427 B2
(45) Date of Patent: Oct. 28, 2008

(54) WIDE DYNAMIC RANGE LINEAR-AND-LOG ACTIVE PIXEL

(75) Inventor: Isao Takayanagi, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 498 days.

(21) Appl. No.: 10/226,127

(22) Filed: Aug. 23, 2002

(65) Prior Publication Data

US 2004/0036785 A1 Feb. 26, 2004

(51) Int. Cl.
*H01L 31/062* (2006.01)
*H01L 31/113* (2006.01)
*H04N 9/73* (2006.01)
*H04N 3/14* (2006.01)
*H04N 5/335* (2006.01)

(52) U.S. Cl. .................... 348/223.1; 348/294; 348/301; 348/308; 257/292

(58) Field of Classification Search .............. 348/223.1, 348/294, 300, 301, 302, 308, 655; 257/291, 257/292

See application file for complete search history.

(56) References Cited

U.S. PATENT DOCUMENTS

| | | | |
|---|---|---|---|
| 5,589,879 A | * | 12/1996 | Saito et al. ............... 348/223.1 |
| 6,191,408 B1 | | 2/2001 | Shinotsuka et al. |
| 6,895,256 B2 | * | 5/2005 | Harma et al. ............ 455/556.1 |
| 2001/0002848 A1 | * | 6/2001 | Fossum et al. ............. 348/311 |
| 2002/0033445 A1 | | 3/2002 | Mattison |
| 2004/0149889 A1 | * | 8/2004 | Shinotsuka et al. ....... 250/214.1 |

FOREIGN PATENT DOCUMENTS

| | | |
|---|---|---|
| EP | 0828297 A2 | 3/1998 |
| EP | 0933928 A2 | 4/1999 |
| EP | 1187217 A2 | 3/2002 |

OTHER PUBLICATIONS

Ricquier et al., N., "Active Pixel CMOS Image Sensor with On-Chip Non-Uniformity Correction".
Kavadias et al., S., "P8: On-chip offset callibrated logarithmic response image sensor", pp. 68-71.
Sasaki et al., M., "P4 A CMOS Image Sensor Integrating Gamma Correction and Gain Control Functions", pp. 52-55.
Fox et al., E., "Wide-Dynamic-Range Pixel with Combined Linear and Logarithmic Respinse and Increased Signal Swing".

* cited by examiner

*Primary Examiner*—John M. Villecco
*Assistant Examiner*—Daniel M Pasiewicz
(74) *Attorney, Agent, or Firm*—Dickstein Shapiro LLP

(57) ABSTRACT

A pixel circuit having an improved dynamic range is disclosed. When incoming light detected by the photodiode is strong, the accumulated (integrated) charge on a signal capacitor becomes large. To compensate, the excess signal component becomes compressed and the pixel circuit begins operating in logarithmic rather than linear mode. In this way, the circuit can achieve a higher dynamic range more closely resembling the image sensing properties of the human eye.

6 Claims, 5 Drawing Sheets

WIDE DYNAMIC RANGE LINEAR-AND-LOG ACTIVE PIXEL

FIELD OF THE INVENTION

The present invention relates to a pixel circuit which operates in both linear and logarithmic regions, to obtain an improved dynamic range.

BACKGROUND OF THE INVENTION

Imaging systems often need to have pixels capable of handling a wide dynamic range to accommodate varying brightness levels of an imaged scene. Several different pixel circuit architectures have been developed for this purpose. However, they generally increase pixel circuit complexity and present difficulties such as increased pixel size, non-linear response characteristics, and pixel-to-pixel signal deviations, among others.

BRIEF SUMMARY OF THE INVENTION

The present invention discloses a simple pixel architecture which achieves increased dynamic range by having both a linear and a logarithmic response characteristic. A method of operating the pixel is also provided.

In one aspect, the invention discloses a pixel circuit having an integration node; a conversion transistor having a source/drain connected to the integration node and a drain/source connected to a reset line; a feed-through pulse capacitor having one leg connected to a feed-through pulse signal line and the other leg connected to the integration node; a photodiode having one leg connected to the integration node; and an output transistor having a gate connected to the integration node. The pixel circuit operates in a linear mode when the integrated charge at the node is at a lower level which causes the conversion transistor to operate in an shut-off mode and operate in a logarithmic mode when the integrated charge is at a higher level which causes the conversion transistor operates in a sub-threshold mode.

In yet another aspect the invention provides a method of operating the pixel circuit. The method includes operating the reset and feed through pulse signal lines to provide a maximum reset voltage at a pixel integration node, providing the reset voltage as a reset output signal through an output transistor, accumulating charge at the node with the photodiode during an accumulation period in which the conversion transistor operates first in an shut-off range and, if needed, then in a sub-threshold range to produce an image signal at the node, and providing the image signal as a pixel output signal through the output transistor.

These and other features and advantages of the invention will be more clearly seen from the following detailed description of the invention which is provided in connection with the accompanying drawings.

DETAILED DESCRIPTION OF THE INVENTION

Figure 1:
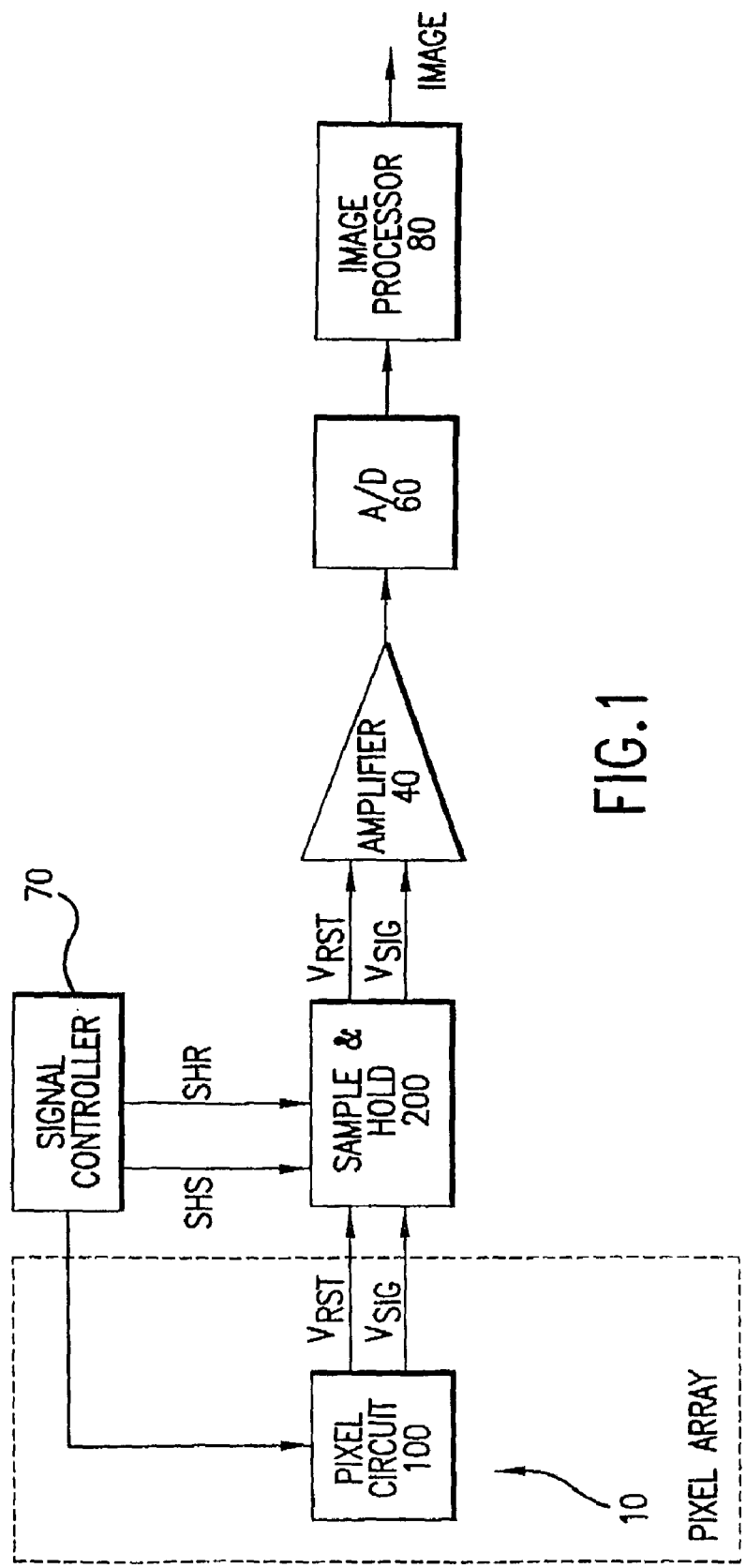
FIG. 1 is a block diagram of an imaging device of the present invention.

The present invention is employed in a CMOS imaging device generally illustrated in FIG. 1 by numeral 10. The imaging device includes an array of pixels arranged in rows and columns with each pixel having a pixel circuit 100. The pixel circuit 100 provides a reset signal $V_{RST}$ and a pixel image signal $V_{SIG}$ as outputs during a reset and integration period which are captured by the sample and hold circuit 200 respectively in response to sampling signals SHS (for the image signal) and SHR (for the reset signal). A sample and hold circuit 200 is provided for each column of pixels. Since the pixels are selected in a row by row fashion each pixel column will have a column line to which all pixels of that column are connected. The sample and hold circuit 200 provides the reset signal $V_{RST}$ and image signal $V_{SIG}$ of a pixel circuit 100 to an amplifier 40 which in turn provides a signal representing the difference between the reset signal and pixel image signal ($V_{RST-VSIG}$) as an output. This difference signal is provided to an analog to digital converter 60 and from there to an image processor 80 which receives digitized pixel signals from all pixel circuits 100 of the pixel array and provides an image output.

Figure 2:
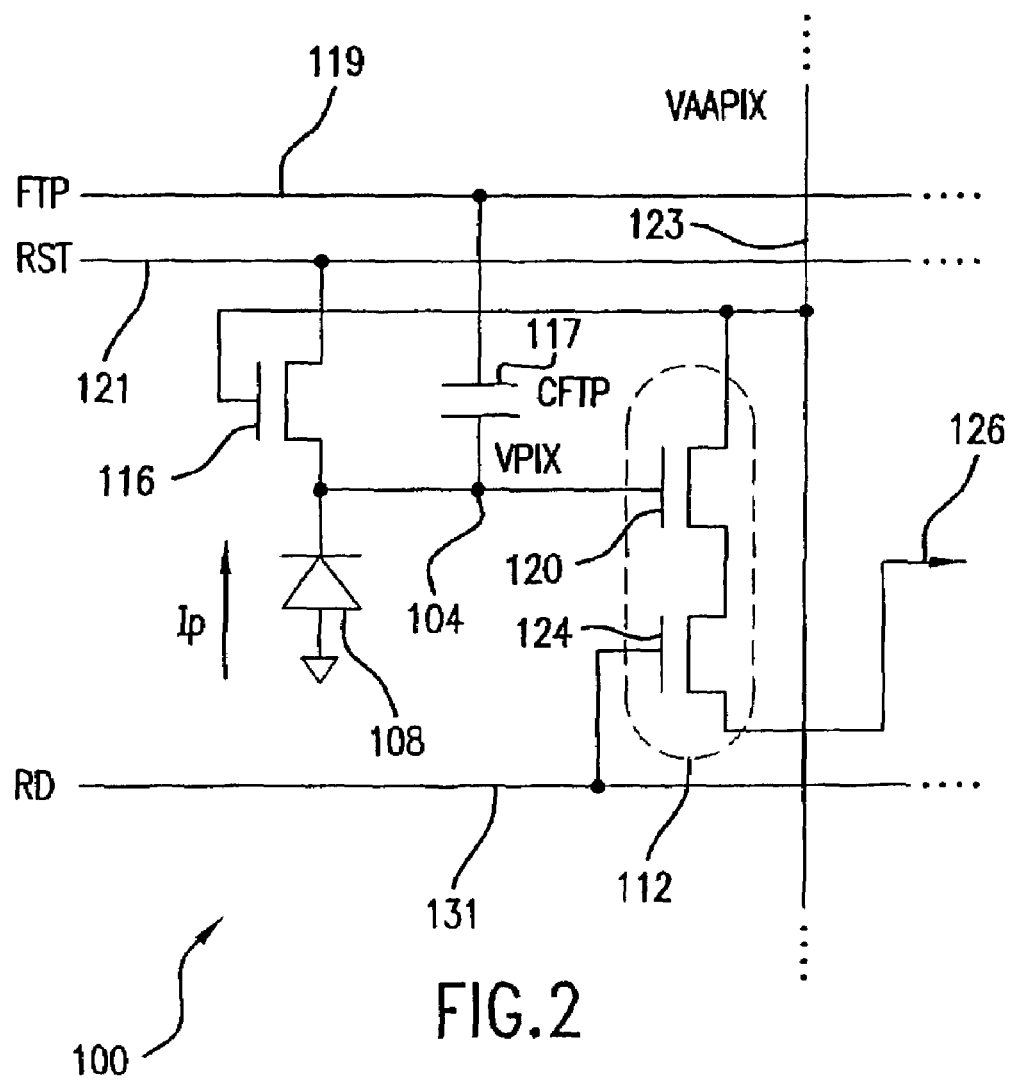
FIG. 2 is a schematic diagram of the active pixel circuit of the present invention.

The active pixel circuit 100 in accordance with the invention is shown in more detail in FIG. 2. It includes a conversion transistor 116, an output transistor 120, a row select transistor 124, a photodiode 108, and a feed-through capacitor 117. Also provided are a row select signal line 131 receiving a row select signal RD, a reset signal line 121 receiving a reset signal RST and a feed through pulse line 119 receiving a feed through pulse signal FTP. A voltage supply line 123 is also provided which supplies a voltage VAAPIX to the pixel circuit 100. The conversion transistor 116 has a gate threshold voltage of Vt and is operated either in a shut-off voltage operating mode or a sub-threshold voltage operating mode, as described in greater detail below. The feed through capacitor 117 is located between the horizontal feed through pulse (FTP) signal line 119 and a signal integration node 104. One source/drain region of the transistor 116 is connected to the row reset (RST) signal line 121, while the gate of transistor 116 is connected to the power supply line VAAPIX 123, and the other source/drain region of transistor 116 is connected to integration node 104. The photodiode 108 is connected to the integration node 104 and ground. One source/drain region of an output transistor 120 is connected to the supply line VAAPIX 123 while the gate of transistor 120 is connected to the integration node 104. The gate of row select transistor 124 is connected to the row select signal line which receives the row select signal RD, while the source/drain regions of the transistor 124 are respectively coupled to output transistor 120 and column line 126.

When connected to the column line 126 through the row select transistor 124, the output transistor 120 operates as a source follower transistor and provides a gain to the charge signal received from node 104.

As noted, transistor 116 has two operating modes. One operating mode is a shut-off operating mode in which the transistor 116 imparts a linear output to an accumulated pixel image signal $V_{SIG}$ at node 104 during a charge integration period, while the other operating mode is a sub-threshold operating mode which imparts a logarithmic output to the pixel image signal $V_{SIG}$ accumulated at node 104.

Figure 3:
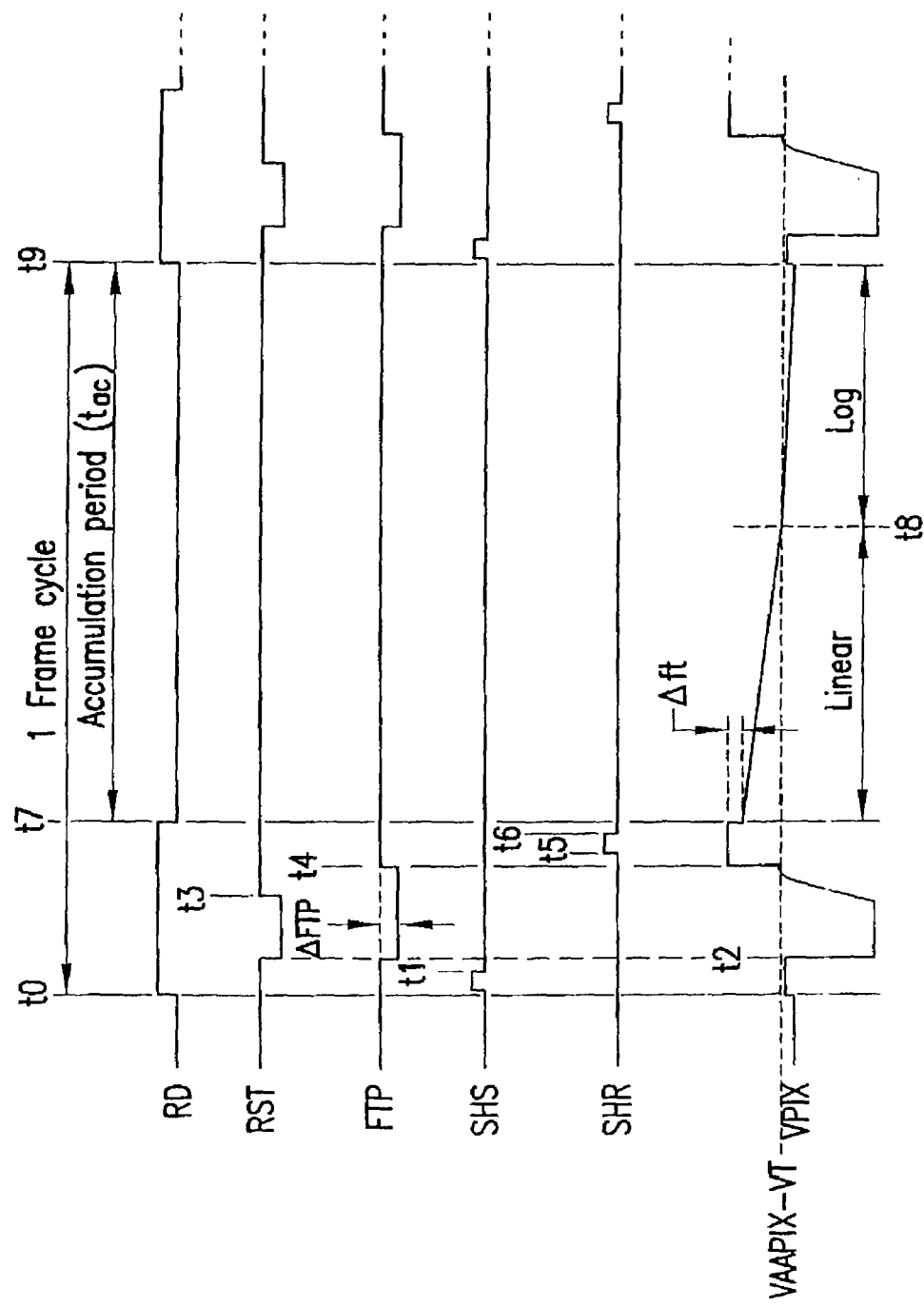
FIG. 3 is a timing diagram depicting operation of the pixel circuit of FIG. 2.

The operation of the pixel circuit 100 will now be explained with reference to the timing diagram of FIG. 3, which shows a typical frame cycle during operation of the pixel circuit 100. At the time t0, the sample and hold signal (SHS) pulse which causes pixel image signal sampling is applied to a sample and hold circuit which causes the pixel image signal $V_{SIG}$ to be sampled and held. The row select signal RD is also high, signifying that charge accumulated at a node 104 is being read out. This charge was accumulated at node 104 prior to the time t0. At the time t1, the SHS pulse goes low thus completing the sampling of the image signal $V_{SIG}$ voltage level. At the time t2, the RST line and the feed-through pulse line (FTP) go low. This causes VPIX, the voltage at node 104, to be set to the RST line 121 low voltage. At time t3, the RST line 121 goes high beginning the process of resetting the pixel. This causes VPIX, the voltage at node 104, to begin increasing toward VAAPIX-Vt(116). At time t4, the FTP line goes high which causes VPIX to reach the level shown in equation (2) below:

$$VPIX = VAAPIX - Vt(116) + CFTP/CPIX \times \Delta FTP \qquad (2)$$

where CFTP is the capacitance of the capacitor 117, CPIX is the total capacitance at the node 104, and ΔFTP represents the difference between the high and low state of the FTP line 119, as shown in FIG. 3.

At the time t5, the SHR pulse goes high, thus sampling the reset voltage level by the sample and hold circuit 200. The pixel circuit reset voltage $V_{RST}$ is produced by the output transistor 120 and is applied through the select transistor to the column line 126. At time t6, the SHR pulse goes low, ending the sampling of the reset voltage VRST. At time t7, the RD line goes low ending the first readout process, and beginning a charge accumulation (integration) period. During the period from t7 to t8, the conversion transistor 116 operates in an shut-off mode and a linear accumulated charge signal is processed at the node 104. At the time t8, the conversion transistor 116 switches to a subthreshold operating mode as the accumulated signal at node 104 forces the transistor 116 into a sub-threshold operation region. At the point t8 the pixel voltage VPIX at node 104 transitions from a linear to a logarithmic output signal, as shown in shown in equation (3) below.

$$VPIX = VAAPIX - Vt(116) + CFTP/CPIX \times [\Delta FTP - \Delta ft] \qquad (3)$$

In the equation (3) the symbol Δft is used, which as shown in FIG. 3 represents the instantaneous drop in VPIX at time t7 which occurs when the circuit 100 begins operating in a linear integration mode.

At the time t9, the RD and SHS lines go high, the charge accumulation (integration) period ends and the accumulated pixel voltage VPIX is read out by the transistors 120, 124 as the pixel image signal $V_{SIG}$ and a new frame cycle begins.

The SHS and SHR pulses correspond to when the signal and reset voltages, respectively, are sampled. As with the control lines FTP, RD, and RST, the SHR and SHS pulses are produced by the signal controller 70 (FIG. 1).

The sampled signal $V_{SIG}$ and reset $V_{RST}$ voltages are then subtracted by amplifier 40 to obtain valid pixel image data. In equation (2) the symbol ΔFTP is used, which as shown in FIG. 3 symbolizes the difference between the high and low states of the FTP line. The voltage on the FTP line enables the circuit to achieve both linear and logarithmic responses, depending on the level of accumulated charge on the node 104. This is because when signal charge accumulates at the node 104 (FIG. 2) is small, they can all be integrated at the node 104. However, as the amount of signal charge increases to the point where some overflows to the transistor 116 (at time t8 in FIG. 3), the photo response of the entire circuit becomes logarithmic. Thus, the FTP signal line provides a way to achieve linear response under low illumination conditions, yet preserve the circuit's logarithmic capability for higher illumination conditions. As shown in FIG. 3, the crossover between the linear and logarithmic regions occurs at a pixel node 104 voltage of VAAPIX-$V_T$(116).

During the time the circuit 100 is operating in linear mode (time period t7 through t8), the photo conversion signal PCS can be expressed as follows.

$$PCS = GAIN_{SF} \times (t_{ac} \times I_P / CPIX) \qquad (4)$$

where $GAIN_{SF}$ is the source follower 112 gain, $t_{ac}$ is the integration (accumulation) time as shown in FIG. 3, $I_P$ is the photodiode current, and CPIX is the total capacitance at the node 104.

However, when the circuit 100 transitions to operating in logarithmic mode (time period t8 through t9), the photo conversion signal PCS can be expressed as follows.

$$PCS = GAIN_{SF} \times [CFTP/CPIX \times [\Delta FTP - \Delta ft] \times [(1/\beta) \times \log(I_P)]] \qquad (5)$$

where CFTP is the capacitance of the capacitor 117, and the symbol β represents an exponential coefficient of the sub-threshold current of the transistor 116. Variations in threshold voltage Vt are one of the most well known causes of instability in MOS transistors. However, variations in the threshold voltage Vt do not affect photoconversion characteristics of the circuit 100. Because threshold voltage changes within the conversion transistor 116 cause the same level shift for both the reset and the transition levels expressed by the equations (2) and (3) above, Vt(116) does not contribute to the range of linear operation of VPIX. Additionally, by subtracting $V_{RST}$ from $V_{SIG}$, variations in Vt(120) are also suppressed. Consequently, Vt components are not contained in the output 126 of the circuit 100.

Meanwhile, the conversion gain in both the linear and logarithmic operating regions are determined by the feed through capacitor CFTP, pixel overall capacitance CPIX, and β, as shown in the equation (5) above. Fortunately, variations in these parameters are much smaller than the threshold voltage Vt. Thus, improved uniformity and stability of the circuit 100 is achieved, and problems with fixed pattern noise (FPN) are reduced.

In equation (5) above, the total capacitance of the pixel node 104 is represented as CPIX. CPIX consists, of course, of CFTP but also includes the capacitance of the photodiode 108 and the sum of parasitic capacitances of the circuit 100 such as the gate capacitance of the transistor 120, and the junction capacitance of the source node of the transistor 116. Prior to a reset operation, a substantial amount of charge is injected into the pixel capacitor CFTP and its potential is then pinned at the 'low' level of the RST line as shown between the time period t2-t3 of FIG. 3. Because of this pinning action, the primary integrated signal is fully discharged from CPIX, so that the reset operation completely resets the circuit 100, and excess charge from previous imaging cycles of the circuit 100 does not 'lag' into following imaging cycles.

While the transistor 116 is operating in sub-threshold mode during the time period t8-t9, any excess charge (overflow) present on the pixel node 104 is drained through the transistor 116. Another contribution to more effective resetting of the circuit 100 is that, during the reset time period t2-t3, the current through the transistor 116 is much larger than the photocurrent $I_p$. Therefore, temporal photocurrent during the reset time period does not affect the reset operation, so that a stable reset level for the photodiode 108 can be obtained for the subsequent accumulation period, which thereby reduces image lag.

Figure 4:
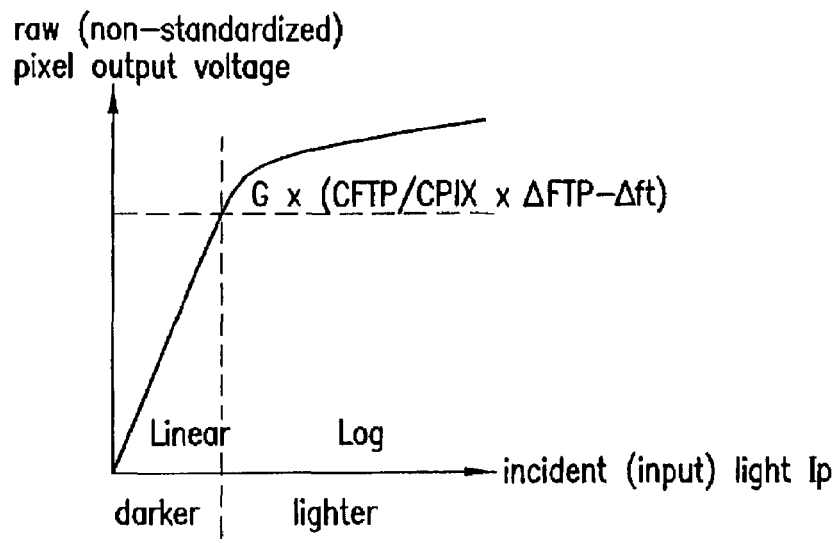
FIG. 4 is a graph of the raw linear and logarithmic response regions of the FIG. 2 pixel.
Figure 5:
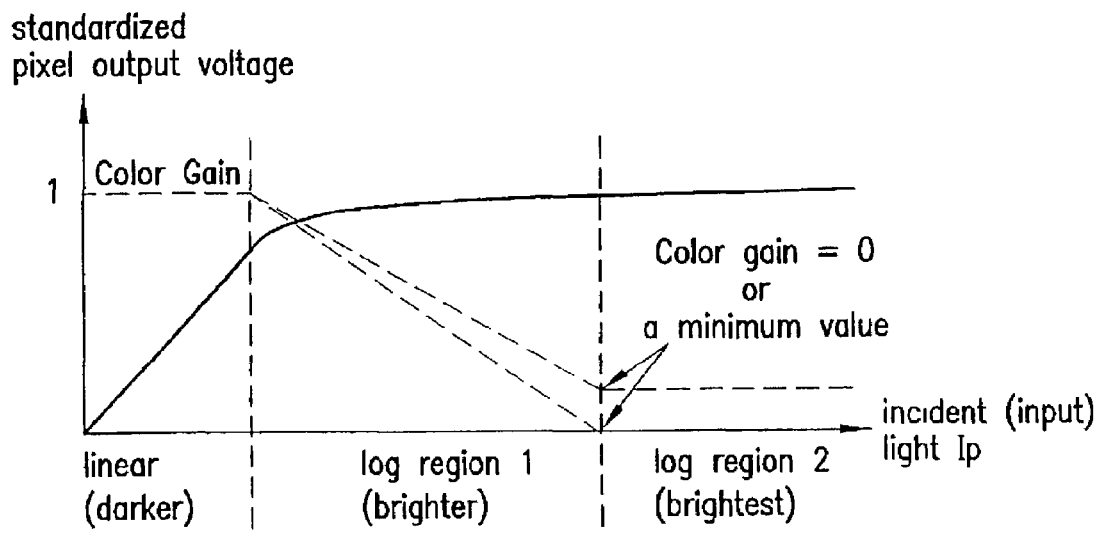
FIG. 5 is a graph of the standardized linear and logarithmic response regions of the FIG. 2 pixel.

When incoming light detected by the photodiode 108 is exceptionally strong, the accumulated (integrated) charge on the capacitor CFTP becomes large. However, any excess signal component (excess charge) becomes compressed because the circuit 100 begins operating in a logarithmic mode. In this way, the circuit 100 can achieve a higher dynamic range more closely resembling the image sensing properties of the human eye. However, special color processing functions (standardization) are still needed for situations where exceptionally bright light is incoming onto the photodiode 108. FIG. 4 shows the raw, non-standardized pixel output voltage of the circuit 100 without any processing by the image processor 80. FIG. 5 shows the standardized pixel output voltage of the circuit 100 after processing by the image processor 80.

When the circuit 100 is operating in the linear mode (FIGS. 3-5), the color enhancement gain Gc is at unity, i.e. equal to 1. When the circuit 100 is operating in the logarithmic mode, the output range is divided into regions 1 and 2, as shown in FIG. 5, where the dividing line between the two regions is an arbitrary, predetermined amount of incident light on the photodiode 108. FIG. 5 shows that a pixel's color may be shifted to white or to some other color by the image processor 80 (FIG. 1), depending on the brightness level of that signal. In region 1 of FIG. 5, the color enhancement gain Gc ranges between 0 and 1 and is not affected by the image processor 80. However, when a pixel signal is within the logarithmic region 2, the color signal is either eliminated (Gc=0) or set to a predetermined minimum value (Gc=Gcmin) by the image processor 80.

Figure 6:
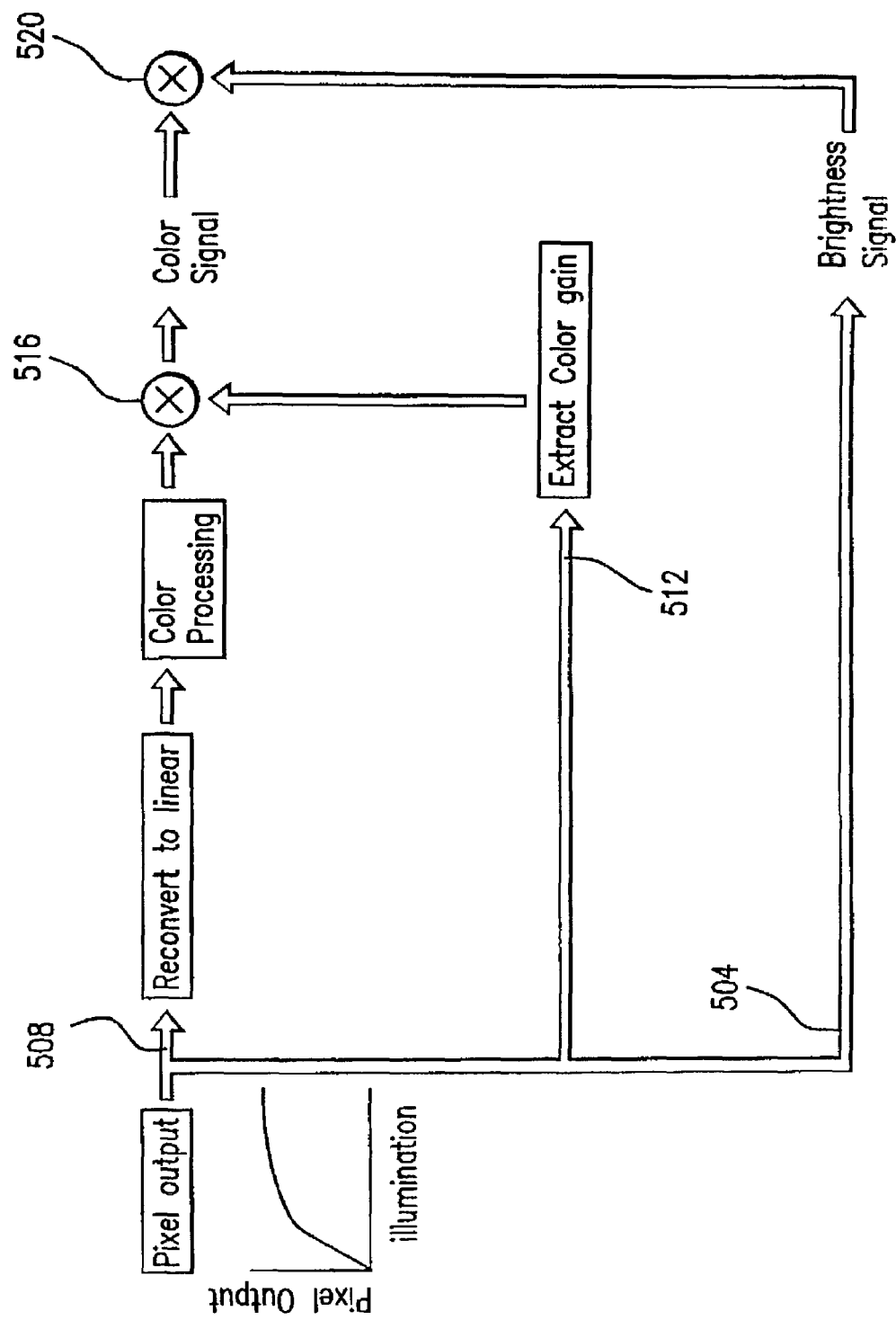
FIG. 6 is a flowchart depicting the process of separating, processing, and recombining the color and brightness signals outputted from the pixel circuit of FIG. 2.

FIG. 6 details the standardization process employed by the image processor 80 (FIG. 1) in breaking down logarithmic pixel signals into separate color and brightness components. The digitized pixel output originating from the analog to digital converter 60 is divided into three separate signal branches 504, 508, and 512 by the image processor 80. Branch 504 is for brightness signal extraction, branch 508 is for color signal extraction, and branch 512 is for color gain extraction. In the branch 508, the pixel output is reconverted from a logarithmic to a linear response, then transferred to a color processing circuit to extract its color component. In branch 512, a color gain factor is calculated from the pixel output level as shown in FIG. 5. The color component is then multiplied by the factor of the color gain at processing step 516. From both the gained color signal and brightness signal obtained in the processing branch 504, a final color video signal is constructed at the processing step 520. The brightness component extracted in processing branch 504 requires no additional processing (thus remains "raw"), but it is necessary to process (standardize) the color component 508, 512 prior to applying the gain at processing step 516. Because the photo signal is compressed logarithmically in the pixel output, calculation error increases in reconverting data to the linear response with increasing brightness, which unfortunately increases color noise in high illumination portions of the images. However, by decreasing color gain in the high illumination conditions at the processing step 516, the color noise can be suppressed thereby yielding a more natural looking low-noise color image.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of The United States is:

1. A method of operating a pixel circuit, comprising:
   collecting photogenerated charge at an integration node in response to a pixel signal during a charge integration period;
   operating a first transistors, in a shut-off mode, during said integration period when the amount of said collected charge is below a threshold value to cause charge to be linearly collected at said node;
   operating said first transistor, in a sub-threshold mode, during said integration period when said collected charge is above said threshold to cause charge to be logarithmically collected at said integration node;
   prior to a reset operation, injecting charge into a pixel capacitor coupled to said integration node;
   during the time said first transistor is operating in the sub-threshold mode, draining excess charge from said integration node through the first transistor;
   separating said collected charge into color and brightness components;
   processing said color component;
   recombining said brightness and color components;
   dividing said logarithmic charge-accumulation phase into first and second logarithmic phases corresponding to lower and higher saturation levels respectively; and
   for said second logarithmic phase, eliminating a color signal from an output of said pixel during the processing of said color component.

2. A method of operating a pixel circuit, comprising:
   collecting photogenerated charge at an integration node in response to a pixel signal during a charge integration period;
   operating a first transistors, in a shut-off mode, during said integration period when the amount of said collected charge is below a threshold value to cause charge to be linearly collected at said node;
   operating said first transistor, in a sub-threshold mode, during said integration period when said collected charge is above said threshold to cause charge to be logarithmically collected at said integration node;
   prior to a reset operation, injecting charge into a pixel capacitor coupled to said integration node;
   during the time said first transistor is operating in the sub-threshold mode, draining excess charge from said integration node through the first transistor;
   separating said collected charge into color and brightness components;
   processing said color component;
   recombining said brightness and color components;
   dividing said logarithmic charge-accumulation phase into first and second logarithmic phases corresponding to lower and higher saturation levels respectively; and
   for said second logarithmic phase, setting a color signal from an output of said pixel to a predetermined minimum value during the processing of said color component.

3. The method of claims 1 or 2, wherein said step of injecting charge comprises, prior to a reset operation, applying a low signal to one of a source and drain terminal of said first transistor and a terminal of a pixel capacitor thereby injecting charge into the pixel capacitor and pinning said pixel capacitor at a low level of a reset line.

4. The method of claim 3, further comprising the acts of:
subsequent to said step of applying a low signal, applying a high signal to said one of the source and drain terminal of said first transistor while maintaining said low signal on said terminal of said pixel capacitor, and subsequent to said step of applying a high signal to the source/drain terminal of said first transistor, applying a high signal to said terminal of said capacitor.

5. A method of operating a pixel circuit comprising:
collecting photogenerated charge at an integration node in response to a pixel signal during a charge integration period;
operating a first transistors, in a sub-threshold mode, during said integration period when said collected charge is above a threshold voltage of said first transistor to cause charge to be logarithmically collected at said integration node;
dividing said logarithmic charge-collection phase into first and second logarithmic phases corresponding to lower and higher saturation levels respectively; and
processing a signal representing said charge collected during said second logarithmic phase by setting a color signal to a predetermined minimum value.

6. The method of claim 5, wherein the act of processing comprises setting said color signal value to zero.

* * * * *

UNITED STATES PATENT AND TRADEMARK OFFICE
CERTIFICATE OF CORRECTION

PATENT NO. : 7,443,427 B2  Page 1 of 1
APPLICATION NO. : 10/226127
DATED : October 28, 2008
INVENTOR(S) : Takayanagi It is certified that error appears in the above-identified patent and that said Letters Patent is hereby corrected as shown below:

On the title page, item (56), under "Other Publications", in column 2, line 3, delete "callibrated" and insert -- calibrated --, therefor.

On the title page, item (56), under "Other Publications", in column 2, line 8, delete "Respinse" and insert -- Response --, therefor.

In column 6, line 10, in Claim 1, delete "transistors," and insert -- transistor, --, therefor.

In column 6, line 37, in Claim 2, delete "transistors," and insert -- transistor, --, therefor.

In column 7, line 13, in Claim 5, delete "transistors," and insert -- transistor, --, therefor.

Signed and Sealed this

Third Day of March, 2009

JOHN DOLL
*Acting Director of the United States Patent and Trademark Office*